(12) United States Patent
Park et al.

(10) Patent No.: US 8,381,145 B2
(45) Date of Patent: Feb. 19, 2013

(54) METHOD AND APPARATUS FOR ANALYZING FAULT BEHAVIOR OF A SOFTWARE DESIGN MODEL

(75) Inventors: Sachoun Park, Daejeon (KR); Jung Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 176 days.

(21) Appl. No.: 12/912,429

(22) Filed: Oct. 26, 2010

(65) Prior Publication Data

US 2011/0246954 A1  Oct. 6, 2011

(30) Foreign Application Priority Data

Mar. 30, 2010 (KR) .................. 10-2010-0028738

(51) Int. Cl.
*G06F 17/50* (2006.01)
(52) U.S. Cl. ......... 716/106; 716/101; 716/102; 716/111
(58) Field of Classification Search .................. 716/101, 716/102, 106, 111; 717/124
See application file for complete search history.

(56) References Cited

U.S. PATENT DOCUMENTS

| 6,505,342 | B1 * | 1/2003 | Hartmann et al. | 717/104 |
| 7,971,104 | B2 * | 6/2011 | Dolev et al. | 714/55 |
| 8,001,519 | B2 * | 8/2011 | Conallen et al. | 717/105 |
| 8,099,711 | B2 * | 1/2012 | Bahrs et al. | 717/105 |
| 8,122,436 | B2 * | 2/2012 | Costa et al. | 717/128 |
| 2007/0277151 | A1 * | 11/2007 | Brunel et al. | 717/113 |
| 2007/0288885 | A1 * | 12/2007 | Brunel et al. | 717/104 |
| 2009/0307654 | A1 | 12/2009 | Ishikawa et al. | |

FOREIGN PATENT DOCUMENTS

KR  10-2002-0046444 A  6/2002

OTHER PUBLICATIONS

Matthew Hause,"The SysML Modelling Language", Sep. 2006, INCOSE, Fifth European Systems Engineering Conference, Technical Digest, 12 pages.*
Zhu et al.,"A Mode-Based Aspect-Oriented Framework for Building INtrusion-Aware Software Systems", 2009, Journal of Information and Software Technology 51, pp. 865-875.*
Schafer, Timm; Knapp, Alexander; and Merz, Stephan; "Model Checking UML State Machines and Collaborations", Electronic Notes in Theoretical Computer Science, vol. 47, pp. 1-13, 2001.
Uchitel, Sebastian; Kramer, Jeff; and Magee, Jeff; "Synthesis of Behavioral Models from Scenarios", IEEE Transactions on Software Engineering, vol. 29, No. 2, pp. 99-115, Feb. 2003.

\* cited by examiner

*Primary Examiner* — Sun Lin
(74) *Attorney, Agent, or Firm* — Kile Park Geokjian Reed & McManus PLLC

(57) ABSTRACT

An apparatus for analyzing a fault behavior, includes a satisfiability modulo theories (SMT) conversion block for performing SMT conversion with respect to a protocol state machine diagram and a sequence diagram of a software design model. Further, the apparatus for analyzing the fault behavior includes an SMT processing block for performing a SMT processing using respective logic formulas corresponding to the protocol state machine diagram and the sequence diagram and outputted from the SMT conversion block, and determining whether the result of the SMT processing is satisfied to output an occurrable behavior scenario when the result of the SMT processing is satisfied.

20 Claims, 3 Drawing Sheets

METHOD AND APPARATUS FOR ANALYZING FAULT BEHAVIOR OF A SOFTWARE DESIGN MODEL

CROSS-REFERENCE TO RELATED APPLICATION(S)

The present invention claims priority of Korean Patent Application No. 10-2010-0028738, filed on Mar. 30, 2010, which is incorporated herein by reference.

FIELD OF THE INVENTION

The present invention relates to a technique of analyzing a fault behavior with respect to a software design model; and more particularly to, a method and an apparatus for analyzing the fault behavior, which is suitable for verifying correspondence between a protocol state machine diagram and a sequence diagram with respect to a software design model.

BACKGROUND OF THE INVENTION

As well known, as a model-based development is rising, the importance of a design model in an early development is emphasized over the software industries.

Since a precision of the design model becomes an important factor determining developing costs and time of overall system, it is very important to develop software to analyze whether a written design model is precise.

Further, unified modeling language (hereinafter, referred to as 'UML') is a standard language for designing a system model wherein, in UML superstructure specification, a behavior of a system is defined as a behavior within an object and a behavior between objects. The typical diagram representing a behavior within an object is a state machine diagram and the typical diagram representing the behavior between objects is a sequence diagram.

The state machine diagram and the sequence diagram collaborate to define the behavior of a software system. The state machine diagram includes, e.g., a behavioral state machine, a protocol state machine and the like. Specially, since the protocol state machine defines legal transition generated by a class, is not restrained by a specific behavioral construction, and defines legal uses of class, interface, port and the like, the protocol state machine is convenient to describe a life cycle of an object or to define an order of calling operations in a corresponding object. Especially, since the protocol state machine specifies pre-conditions for which operations in an entity is called and post-conditions which are satisfied after the call, the protocol state machine is a very suitable specification to include requirements in the early designing stage of software.

Further, since the sequence diagram is most frequently used to specify scenarios of a system in practices, correspondence analysis between the protocol state machine diagram and the sequence diagram at the early designing stage of software is a very important verification.

In this case, in order to analyze precisely the correspondence between the protocol state machine diagram and the sequence diagram, diagrams are specified using clear formal specification and a formal verification method suitable for a corresponding formal language needs to be used. Model checking is a method of searching all possible cases of specified formal behaviors and is very vigorously used in the field of modern safety engineering.

Bounded model checking (BMC) is a technology proposed to solve the state explosion problem pointed out as disadvantage of the model checking. The BMC is a falsification method of analyzing a system within a certain behavior bound to find an error. The BMC tracks behavior of the system indicating variation of system shapes, e.g., variables, values of the variables and the like up to a restricted range as time goes by to verify whether there is an error. When the BMC denies property of the system and converts the same logically with the system specification while restricting the behavior of the system to K bound, a satisfaction procedure outputs a result called satisfiability and an error scenario, i.e., a model of a system as a basis of the result when there is an error in the bound K. The bound is determined by calculating the maximum number of transmission of messages enabled in the sequence diagram.

In this case, although error is not found by the BMC, it cannot be said there is no error but only there is no error up to a corresponding bound. When an error is found in the corresponding bound, it means that there is an error.

Thus, there is a need for a model checking method of analyzing a software design model, increasing reliability of the analysis results, and automating model checking, like a model checking method for software using the BMC method.

SUMMARY OF THE INVENTION

In view of the above, the present invention provides a method and an apparatus for verifying a software design model using satisfiability modulo theories (referred to as 'SMT') as a proof engine of the bounded model checking (BMC).

Further, the present invention provides a method and an apparatus for analyzing erroneous fault behavior by verifying correspondence between a protocol state machine diagram and a sequence diagram to compare internal behavior and external behavior of an entity in a software design model.

In accordance with a first aspect of the present invention, there is provided an apparatus for analyzing a fault behavior, including: a satisfiability modulo theories (SMT) conversion block for performing SMT conversion with respect to a protocol state machine diagram and a sequence diagram of a software design model; and an SMT processing block for performing a SMT processing using respective logic formulas corresponding to the protocol state machine diagram and the sequence diagram and outputted from the SMT conversion block, and determining whether the result of the SMT processing is satisfied to output an occurrable behavior scenario when the result of the SMT processing is satisfied.

In accordance with a second aspect of the present invention, there is provided a method of analyzing a fault behavior, including: performing satisfiability modulo theories (SMT) conversion of a protocol state machine diagram and a sequence diagram of a software design model; performing SMT processing using respective logic formulas, corresponding to the protocol state machine diagram and the sequence diagram, outputted from the SMT conversion block to determine whether the result of the SMT processing is satisfied; and outputting an occurrable behavior scenario when the result of the SMT processing is satisfied.

In accordance with an embodiment of the present invention, the SMT conversion and the SMT processing are performed by using the protocol state machine diagram and the sequence diagram of the software design model to output occurrable behavior scenarios when the result of the SMT processing is satisfied and to verify a contradictory behavior scenario when the result is dissatisfied.

Consequently, it is possible to effectively verify the correspondence between the protocol state machine diagram and the sequence diagram of a software design model.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
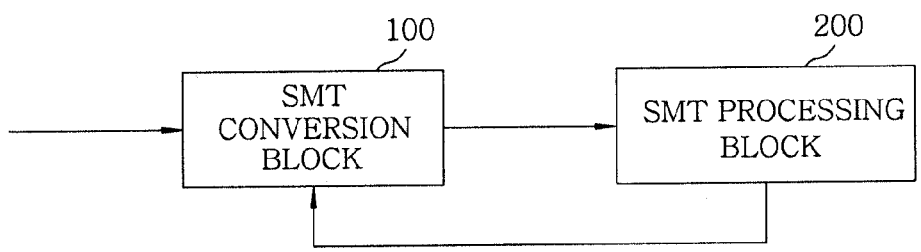
FIG. 1 is a block diagram illustrating an apparatus for analyzing a fault behavior, which is suitable for verifying correspondence between a protocol state machine diagram and a sequence diagram with respect to a software design model in accordance with an embodiment of the present invention.

FIG. 1 is a block diagram illustrating an apparatus for analyzing a fault behavior, which is suitable for verifying correspondence between the protocol state machine diagram and the sequence diagram of the software design model in accordance with the embodiment of the present invention. The apparatus for analyzing the fault behavior includes an SMT conversion block 100 and an SMT processing block 200.

Referring to FIG. 1, the SMT conversion block 100 performs an SMT conversion when the protocol state machine diagram, the sequence diagram, a reverse sequence diagram and the like with respect to the software design model are inputted thereto to output the same in the form of an SMT logic formula. That is, in a case of analyzing the software design model, when the protocol state machine diagram of the software design model is input, the SMT conversion block 100 performs the SMT conversion including, e.g., an event conversion, a Queue operation, state conversion, and a step semantics conversion to output a first SMT logic formula corresponding to the protocol state machine diagram.

Further, when the sequence diagram is input, the SMT conversion block 100 performs the SMT conversion including an early state selection, an occurrable action description, an executing action selection, and a next state description caused by transition to output a second SMT logic formula corresponding to the sequence diagram.

In case of verifying a fault behavior scenario, when the protocol state machine diagram of the software design model is input, the SMT conversion block 100 performs the SMT conversion including an event conversion, a Queue operation, a state conversion, and a step semantics conversion to output the first SMT logic formula corresponding to the protocol state machine diagram. When a reverse sequence diagram, that is, a reverse behavior of the sequence diagram of the software design model is input, the SMT conversion block 100 performs SMT conversion including an early state selection, an occurrable action description, an executing action selection, and a next state description caused by transition to output a third SMT logic formula corresponding to the reverse sequence diagram.

The SMT processing block 200 performs SMT processing of proving satisfiability using the outputted first and second SMT logic formulas or using the outputted first and third SMT logic formulas. In case of analyzing the software design model, the SMT processing block 200 performs the SMT processing of proving satisfiability using the first SMT logic formula corresponding to the protocol state machine diagram and the second SMT logic formula corresponding to the sequence diagram, the first and second SMT logic formulas being outputted from the SMT conversion block 100. Then, the SMT processing block 200 outputs an occurrable behavior scenario of the software design model when the result of the SMT processing is satisfied, and requests the SMT conversion block 100 to verify a contradictory behavior scenario when the result of the SMT processing is dissatisfied.

Further, during the verification of the contradictory behavior scenario, the SMT processing block 200 performs the SMT processing of proving satisfiability using the first SMT logic formula corresponding to the protocol state machine diagram and the third SMT logic formula corresponding to the reverse sequence diagram, the first and third SMT logic formulas are outputted from the SMT conversion block 100. Then, the SMT processing block 200 outputs the contradictory behavior scenario of the software design model when the result of the SMT processing is satisfied, and outputs an internal contradictory result of the protocol state machine diagram when the result of the SMT processing is dissatisfied.

As described above, the SMT conversion and the SMT processing are performed using the protocol state machine diagram and the sequence diagram of the software design model, the occurrable behavior scenario is output when the result of the SMT conversion and the SMT processing are satisfied and the contradictory behavior scenario is verified when the result is dissatisfied. Consequently, it is possible to verify the correspondence between the protocol state machine diagram and the sequence diagram of the software design model.

Figure 2:
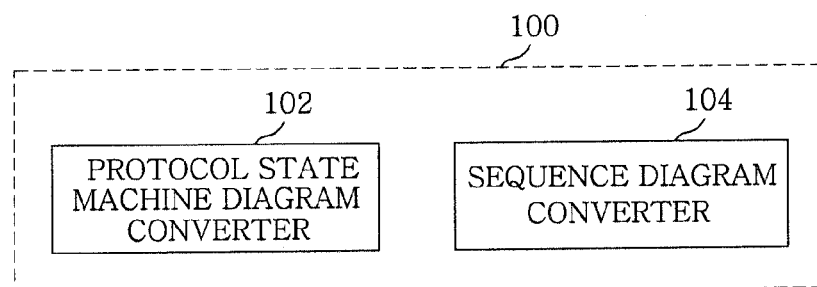
FIG. 2 is a block diagram illustrating an SMT conversion for performing SMT conversion of the protocol state machine diagram and the sequence diagram with respect to the software design model or the protocol state machine diagram and a reverse sequence diagram in accordance with the embodiment of the present invention.

FIG. 2 is a block diagram illustrating an SMT conversion for performing SMT conversion of the protocol state machine diagram and the sequence diagram of the software design model or the protocol state machine diagram and a reverse sequence diagram in accordance with an embodiment of the present invention. The SMT conversion block 100 includes a protocol state machine diagram converter 102 and a sequence diagram converter 104.

Referring to FIG. 2, the protocol state machine diagram converter 102 performs the SMT conversion of the protocol state machine diagram of the software design model to output an SMT logic formula. When the protocol state machine diagram of the software design model is inputted during the analysis of the software design model and the verification of the contradictory behavior scenario, the protocol state machine diagram converter 102 performs the SMT conversion including an event conversion, a queue operation, a state conversion, and a step semantics conversion to output a first SMT logic formula corresponding to the protocol state machine diagram.

Hereinafter, a procedure of the SMT conversion of the protocol state machine diagram will be described in detail as follows. A UML state machine diagram is an object-oriented expansion of the Harel state chart and the protocol state machine is based on the Harel state chart. Since there is a synchronization that an event in the system is processed faster than change of external circumstance, an event queue does not need. However, in accordance with an embodiment of the present invention, all events occurring in the UML are stored in the event queue and the stored events are dispatched and processed. A state that two transitions, which cannot be generated at the same time, would be generated is called transition collision. In a case where two transitions in a special layer relationship collide with each other, priority is given to transition in an upper layer on the Harel state chart but to transition in a lower layer in the UML of the present invention.

Further, in accordance with the embodiment of the present invention, since transition between layers is not allowed and the transition between layers is a statement corresponding to a 'goto' statement in a program, transitions can be expressed to have identical semantics without transition between layers. Moreover, description such as entry/exit in state chart is not allowed and is identically expressed by a recursive transition returning to a state of itself. Here, states of the protocol state machine does not have actions such as 'entry,' 'exit,' and 'do activity,' and deep or shallow history. All transitions of the protocol state machine means a protocol transition.

The protocol transition is to specify legal transition for operations. Transition of the protocol state machine has information, e.g., precondition (guard), trigger, post-condition and the like, and all protocol transition may relate to 0 (zero) or more operation.

Moreover, the protocol transition specifies the related operations to be called to an instance at a starting state and an early condition (guard) and may arrive to an arrived state under a final condition (post-condition) at the end of transition. There is no action in the transition of the protocol state machine.

In this state, the SMT conversion of the protocol state machine is performed by procedures such as an event conversion, Queue operation, a state conversion, and a step semantics conversion. In the event conversion, an event set is expressed by a scalar 'event' that lists types of event that a state machine may have. Here, let a set of event variables be '{play, create, inc, ok, empty}', the set of event variables may be converted into '(define-type Event (scalar play create inc ok empty))'. If the variables are declared as 'Event' type, the variables may have one of the types.

Secondly, in the queue operation, a UML state machine may express queue because the UML state machine stores an occurred event in the queue. However, since an SMT processor does not directly support queue, the queue needs to be expressed by an array.

The array in the SMT is processed as a single of function. The array expressing the queue is '(-> intEvent)' function, receives an integer and returns the event. In this case, the integer may be an index.

Operations handling queue have an 'enQueue' inserting an event into a Queue and 'deQueue' drawing out an event from the Queue. In order to use the Queue, values of a head and a tail need to be kept and changed and are processes as following Definition 1 according to a case when an event is generated due to generation of transition or when an event is dispatched in an event Queue.

[Definition 1]
(define enQueue:: (-> (-> int Event) int Event (-> int Event))
(lambda (q:: (-> intEvent) tail::int e::Event)
(update q (tail) e)))
(define deQueue:: (-> (-> int Event) int Event)
(lambda (q:: (-> intEvent) head::int)
(q head)))

Third, in the state conversion, a state may include another state machine. When it is assumed that the state machines are spread in parallel, the state machine may express which states of the respective state machines are activated with their state sets. Thus, a state machine is declared with a set of states by the following Definition 2.

[Definition 2]
(define-type Machine1 (scalar state0 state1 state2))
(define-type Machine2 (scalar state3 state4))

Fourth, in the step semantics conversion, a step starts from 'STEP 0'. In 'STEP 0', initial values of the respective state machines and events are set and an event Queue is prepared as the initial value of the state machine by the following Definition 3.

[Definition 3]
;; STEP 0
(define e_0:: Event)
(define m1_0:: Machine1)
(define m2_0:: Machine2)
(assert (=m1_0 state0))
(assert (=m2_0 state3))
;; QUEUE
(define queue:: (-> int Event))
(define queue_0:: (-> int Event))
(define head_0::int0)
(define tail_0::int0)
(assert (=queue_0 (enQueue queue tail_0 play)))
(assert (=e_0 (deQueue queue_0 head_0)))

The remaining steps are expressed by repeating 'STEP 1' such that respective state variables in the state diagram and an event variable are defined by the following Definition 4.

[Definition 4]
;; STEP 1—declaration
(define e_1::Event)
(define m1_1::Machine1)
(define m2_1::Machine2)

After that, the transition is defined. The respective transitions are defined by the following Definition 5 to be true when a trigger and the pre-condition are satisfied according to the formal semantics of the defined protocol state machine, a shape is correct, and the transition collision does not exist.

[Definition 5]
;; and trigger guard configuration conflict FREE
(define t1_1::bool (if (and (=e_0 play) (=m2_0 state3) (=m1_0 state0)) true false))
(define t2_1::bool (if (and (pre-condition) (=m2_0 state4) (=m1_0 state1)) true false))
...

Values of the state variables are determined as the following Definition 6 according to whether the transition occurs. However, when a corresponding state is a general state, and when an upper state of the state variables are not activated (that is, /=m1_1 state1), the transition is not generated.

[Definition 6]
;; STEP 1—state (+reset)
(assert (=m2_1 (if (/=m1_1 state1) state3 (if t1_1 state4 (if t2_1 state3 m2_0)))))
...

Next, the variables indicating the head and the tail are modified as times as events occur and a next event is drawn out from the event Queue to be used as the following Definition 7.

[Definition 7]
;; STEP 1—events
(define tail__1__1:: int (if t2__1 (+tail__0 1) tail__0))
(define queue__1__1:: (-> int Event) (if t2__1
(enQueue queue__0 tail__1__1 inc) queue__0))
(define tail__1__2:: int (if t3__1 (+tail__1__1 1) tail__1__1))
(define queue__1__2:: (-> int Event) (if t3__1
(enQueue queue__1__1 tail__1__2 ok) queue__1__1))
(define head__1:: int (if (> tail__1__2 head__0) (+head__0 1) head__0))
(assert (=e__1 (if (=head__1 head__0) empty (deQueue queue__1__2 head__1))))

Finally, processing of the post-condition is satisfied when a corresponding transition occurs and is defined by the following Definition 8.

[Definition 8]
;; STEP 1—variables
(assert post-condition)

As described above, for example, the SMT conversion including the event conversion, Queue operation, the state conversion, and the step semantics conversion is performed to the protocol state machine diagram of the software design model to output the first SMT logic formula corresponding to the protocol state machine diagram.

The sequence diagram converter 104 performs the SMT conversion for the sequence diagram or the reverse sequence diagram of the software design model to output an SMT logic formula. When the sequence diagram with respect to the software design model is inputted during the analysis of the software design model, the sequence diagram converter 104 performs the SMT conversion including the early state selection, the occurrable action description, the executing action selection, and the next state description caused by transition to output the second SMT logic formula corresponding to the sequence diagram.

Further, when the reverse sequence diagram of the software design model is input during the verification of the contradictory behavior scenario, the sequence diagram converter 104 performs the SMT conversion including the early state selection, the occurrable action description, the executing action selection, and the next state description caused by the transition relationship to output the third SMT logic formula corresponding to the reverse sequence diagram.

When the sequence diagram is converted into a labeled transition system (hereinafter, referred to as 'LTS'), when a state set of LTS is {s0, s1} and an action set is {a1, a2, a3}, and when a1 is a possible behavior at the original state s0, a reverse behavior in this state means that a transition is added to arrive at a virtual error state when actions s2 and a3 occur.

In the performance of the SMT conversion of the sequence diagram or the reverse sequence diagram, since the most fundamental element of the sequence diagram is a message transmitted/received between lifelines, the message may occur by a sender as a lifeline where a transmitted event occurs, a receiver where a received event occurs, and a message.

Here, a set of message occurrence may be a finite set 'O={o1, ..., on}' and one message '$o_i \epsilon O$' may be a tuple, i.e., si, mi, and ri. When 'L' is a finite set of life lines and 'g∈Gate' indicates a gate, the one message becomes 'si, ri∈L∪{g}' and a function 'sender, receiver: O->∪Gate' means a function of receiving an occurrence of a message and of returning a life line through which the message is sent and received, that is, may be expressed by 'sender(oi)=si' and 'receiver(oi)=ri'.

Since the message used in the sequence diagram handles only the operator call, a message script 'mi∈CALL' becomes a set of operator calls and 'message: O->CALL' means a function of receiving the message occurrence and of returning a corresponding message.

Meanwhile, 'F={fi, fn}' means a finite set including an interactive operator, an operand, and a guard, wherein one interaction is 'fi∈$2^{operand}$×operator', 'Operand ⊂ Sd' is a subset of the sequence diagram, and '2Operand' is a power set of the operand.

'guard: Operand->Guard∪{ε}' means a function of returning guard that the operand has, wherein 'Guard' means a set of equations to be expressed by a UML constraint, 'Operator={opt, alt, ref, par, seq, loop}' means a set of interactive operators, and the respective operators refer to a meta model of the UML standard document and definitions of a sequence flow seq, am optional flow opt, a repetitive flow loop, an alternative flow alt, reference of flow, and a parallel flow.

Meanwhile, the sequence diagram 'Sd={$sd_0$, $sd_n$}' is a finite set of the interactions, wherein the interaction '$sd_i$=(F, Oi, ≦i)' includes three tuples where 'Oi' means a set of event occurrences belonging to '$sd_i$' and '≦i ⊂ (Oi∪F)×(Oi∪F)' means total order of combination of the message occurrence and the interactions.

In the UML standard specification, since continuous event occurrence is called a trace, trance semantics is a general method suitable to describe meaning of the interaction, and interleaving semantics is applied when two or more trances are combined, the meaning of the sequence diagram is converted into the SMT.

The meaning of the sequence diagram is continuous event occurrences and therefore is expressed with LTS. The LTS includes, e.g., a set of states, a set of actions, an early state, and a transition relationship and the state set and the action set are expressed by the SMT such as the following Definition 9. Here, the state set expressed by the Definition 9 is '{s0, s1, s2, s3, s4, s5, s6, s7, s8}' and the action set is '{play, create, assign, ok, non}'.

[Definition 9]
(define-type_State (scalar s0 s1 s2 s3 s4 s5 s6 s7 s8))
(define-type_Action (scalar play create assign ok non))

The SMT conversion of the sequence diagram will be described. First, the early state needs to be selected and the sequence diagram is expressed by the following Definition 10 when the early state is s0.

[Definition 10]
(define_State__1::_State s0)

Second, occurrable actions at respective states are described. The occurrable action is defined as a function of receiving a state and an action and of returning Boolean value wherein the function means a relationship between the state and the action. The following Definition 11 indicates that a play action is enabled at a state s0 and that a create action and an ok action are enabled at a state s5.

[Definition 11]
(define enable__1:: (->_State_Action bool))
(assert (=(enable__1 s0 play) true))
(assert (=(enable__1 s1 create) true))
(assert (=(enable__1 s2 assign) true))
(assert (=(enable__1 s3 create) true))
(assert (=(enable__1 s4 assign) true))
(assert (=(enable__1 s5 create) true))
(assert (=(enable__1 s5 ok) true))
(assert (=(enable__1 s6 assign) true))
(assert (=(enable__1 s7 ok) true))

Third, an action to be executed is selected. The action to be executed is declared as _Action variable and is described as the following Definition 12 such that an action occurrable at a state variable _State_1, which is declared in the early state, is mapped.

[Definition 12]
(define_Action_1::_Action)
(assert (=(enable_1_State_1_Action_1) true))

Fourth, a next state is described by the transition relationship. The following Definition 13 defines a next state variable _State_2, and indicates that in order for the next state variable _State_2 to have a value s1 a previous state _State_1 is s0 and _Action_1 needs to have a value of play.

[Definition 13]
(define_State_2::_State)
(assert (=> (=_State_2 s1) (and (=_State_1 s0) (_Action_1 play))))
(assert (=> (=_State_2 s8) (or (and (=_State_1 s5) (_Action_1 ok)) (and (=_State_1 s7) (_Action_1 ok)))))

The next state is determined by a currently generated action and the transition relationship. That the next state is assigned means that a condition to be the next state is satisfied and is expressed with the SMT by the above-mentioned Definition 13. The second assert statement means that a case where the next state becomes s8 is that the action ok is generated at a state s5 or at a state s7.

Thus, the SMT conversion is performed to output the protocol state machine diagram in the form of SMT logic formula when the protocol state machine diagram of the software design model is inputted and to output the sequence diagram or the reverse sequence diagram in the form of the SMT logic formula when the sequence diagram or the reverse sequence diagram is inputted, so that the SMT logic formula for the verification of the correspondence between the protocol state machine diagram and the sequence diagram is effectively outputted.

Next, it will be described a method, performed in the apparatus for analyzing the fault behavior, of converting the SMT conversion of the protocol state machine diagram and the sequence diagram to output the SMT logic formulas thereof when the protocol state machine diagram and the sequence diagram are input in an analyzing mode of a software design model, of determining whether the respective SMT logic formulas are satisfied by processing the respective SMT logic formulas, and of outputting an occurrable behavior scenario when the respective SMT logic formulas are satisfied.

Figure 3:
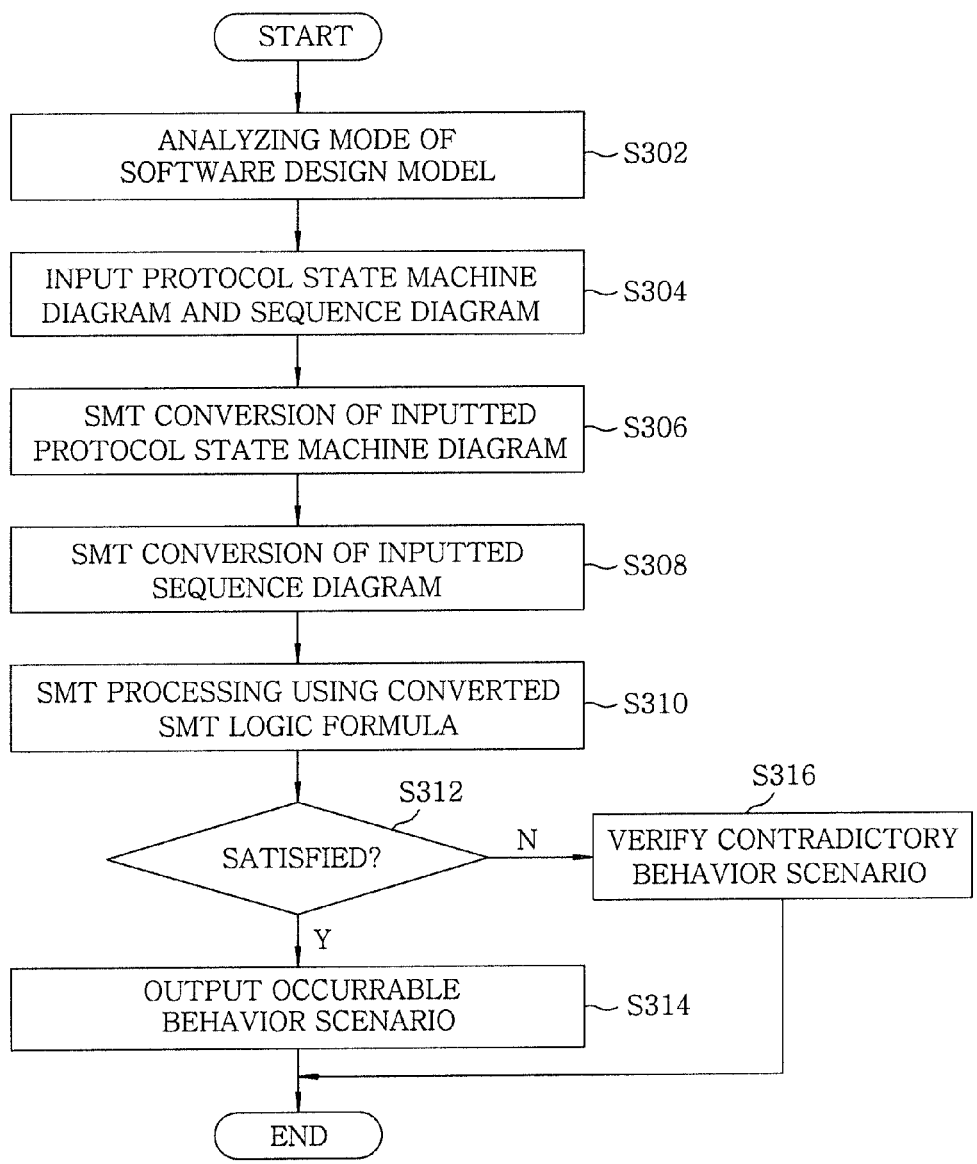
FIG. 3 is a flow chart illustrating a procedure of analyzing correspondence between the protocol state machine diagram and the sequence diagram of the software design model in accordance with an embodiment of the present invention.

FIG. 3 is a flow chart illustrating a method of analyzing correspondence between a protocol state machine diagram and a sequence diagram of a software design model in accordance with an embodiment of the present invention.

Referring to FIG. 3, in step S302 of a software design model analyzing mode of the apparatus for analyzing the fault behavior, the protocol state machine diagram and the sequence diagram of the software design model are inputted into the SMT conversion block 100 in step S304.

When the protocol state machine diagram of the software design model is inputted in the protocol state machine diagram converter 102 of the SMT conversion block 100, the SMT conversion including an event conversion, a Queue operation, a state conversion, and a step semantics conversion is performed in step S306. By doing so, the protocol state machine diagram converter 102 outputs the first SMT logic formula corresponding to the protocol state machine diagram to the SMT processing block 200.

The SMT conversion of the protocol state machine is performed by procedures such as an event conversion, Queue operation, a state conversion, and a step semantics conversion. In the event conversion, an event set is expressed by a scalar 'Event' that lists types of event that a state machine may have.

Since the UML state machine stores the occurred event in the Queue, the Queue operation is performed by expressing the Queue as an array. The array of the SMT is processed as a single function. Operations handling queue have an 'enQueue' inserting an event into a Queue and a 'deQueue' drawing out the event from the Queue. In order to use the Queue, values of a head and a tail need to be kept and changed and are processes according to a case when the event is generated due to generation of transition or when the event is dispatched in an event Queue.

Moreover, in the state conversion, a state may include another state machine. When it is assumed that the state machines are spread in parallel, the state machine is performed by expressing which states of the respective state machines are activated with their state sets. Thus, a state machine is declared with a set of states by the above-mentioned Definition 2.

Meanwhile, in the step semantics conversion, a step starts from 'STEP 0'. In 'STEP 0', initial values of the respective state machines and events are set, an event Queue is expressed as the initial value of the state machine, and the remaining steps are performed by expressing 'STEP 1' repeatedly.

After that, the respective transitions are defined to be true when a trigger and the pre-condition are satisfied according to the formal semantics of the defined protocol state machine, a shape is correct, and the transition collision does not exist. Values of the state variables are determined according to whether the transition is generated. The post-condition is defined to be satisfied when a corresponding transition is generated.

As described above, the SMT conversion including the event conversion, Queue operation, the state conversion, and the step semantics conversion is performed to the protocol state machine diagram of the software design model to output the first SMT logic formula corresponding to the protocol state machine diagram.

The sequence diagram converter 104 of the SMT conversion block 100 performs the SMT conversion including an early state selection, an occurrable action description, an executing action selection, and a next state description caused by a transition relationship when the sequence diagram of the software design model is inputted in step S308. Then, the sequence diagram converter 104 outputs the second SMT logic formula corresponding to the sequence diagram to the SMT processing block 200.

The SMT conversion of the sequence diagram of the software design model is performed by the early state selection, the occurrable action description, the executing action selection, and the next state description caused by a transition relationship. In this case, the early state is selected, the actions occurrable at respective states are described, and the executing action is selected. Here, the executing action is declared as a _Action variable and is described such that an action occurrable at a state variable _State_1, which is declared in the early state, is mapped.

The next state is described according to the transition relationship and is determined by a currently generated action and the transition relationship. That the next state is assigned means that a condition to be the next state needs to be satisfied and is expressed with the SMT by the above-mentioned Definition 13. The second assert statement means that a case where the next state becomes s8 is that the action ok is generated either at a state s5 or at a state s7.

Next, the SMT processing block 200 performs the SMT processing of proving satisfiability using the first SMT logic formula corresponding to the protocol state machine diagram and the second SMT logic formula corresponding to the sequence diagram, which are outputted from the SMT conversion block 100 in step S310.

The SMT processing block 200 checks whether the result of the SMT processing performed in step S310 is satisfied in step S312.

When the result of the SMT processing in step S310 is satisfied in step S312, the SMT processing block 200 outputs an occurrable behavior scenario of the software design model in step S314.

When the result of the SMT processing performed in step S310 is dissatisfied in step S312, the SMT processing block 200 requests the SMT conversion block 100 to verify the fault behavior scenario in step S316.

Consequently, the correspondence between the protocol state machine diagram and the sequence diagram of a software design model can be verified by performing the SMT conversion and the SMT processing using the protocol state machine diagram and the sequence diagram of the software design model to output the occurrable behavior scenarios when the result of the SMT processing is satisfied and to verify a contradictory behavior scenario when the result is dissatisfied.

Next, it will be described a method of performing the SMT conversion of the protocol state machine diagram and the reverse sequence diagram to output the respective SMT logic formulas when the respective SMT logic formulas are dissatisfied in the analyzing mode of the software design model, and of determining whether the respective SMT logic formulas are satisfied by performing the SMT processing of the respective outputted SMT logic formulas to output a contradictory behavior scenario when the respective SMT logic formulas are satisfied.

Figure 4:
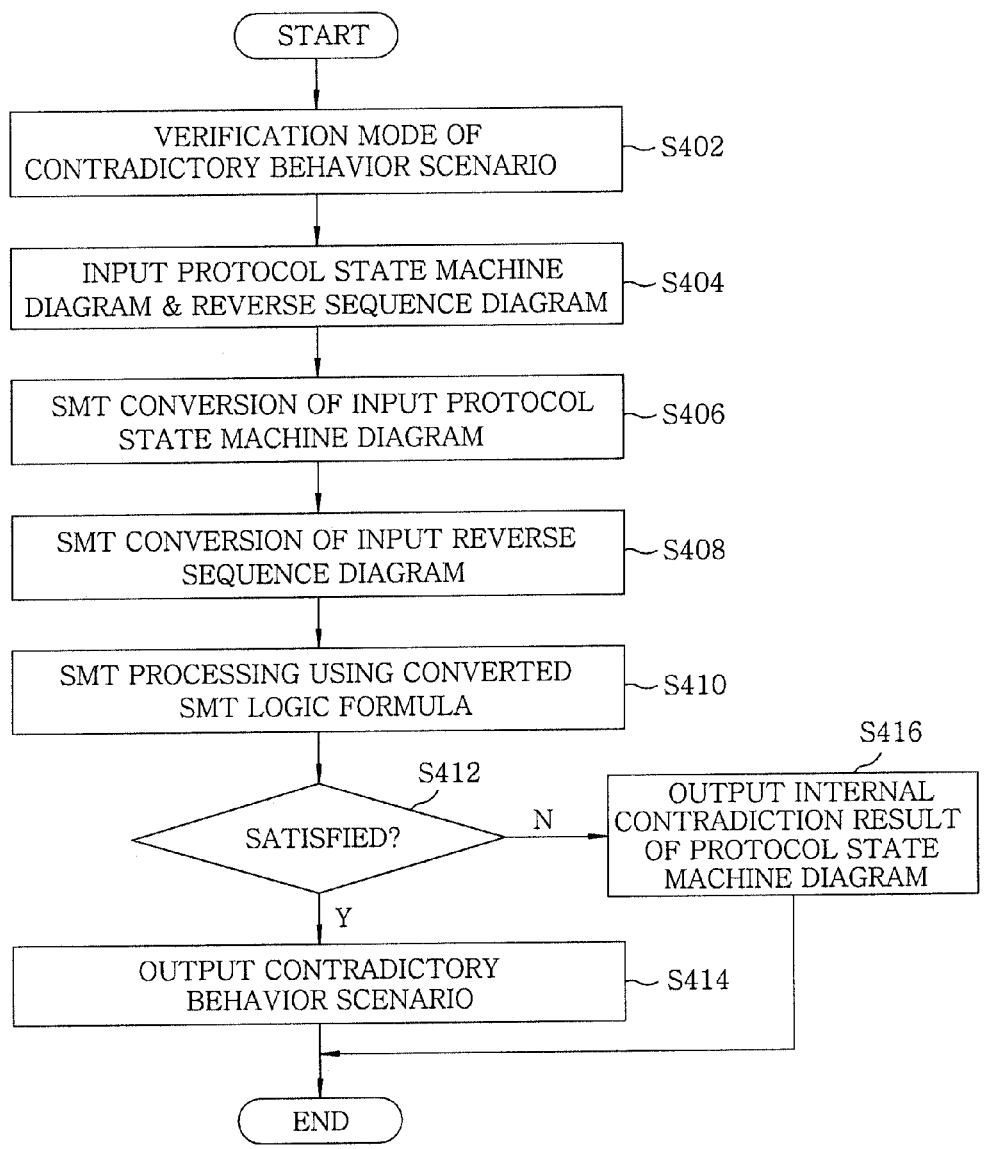
FIG. 4 is a flow chart illustrating a procedure of verifying a contradictory behavior scenario of the software design model.

FIG. 4 is a flow chart illustrating a method of verifying a contradictory behavior scenario of the software design model.

Referring to FIG. 4, in step S402 of a verification mode of a contradictory behavior scenario in the apparatus for analyzing fault behavior, the protocol state machine diagram and the reverse sequence diagram of the software design model are inputted to the SMT conversion block 100 in step S404.

When the protocol state machine diagram of the software design model is inputted, the protocol state machine diagram converter 102 of the SMT conversion block 100 performs the SMT conversion including an event conversion, a Queue operation, a state conversion, and a step semantics conversion in step S406. By doing so, the protocol state machine diagram converter 102 outputs the first SMT logic formula corresponding to the protocol state machine diagram to the SMT processing block 200.

Here, the SMT conversion of the protocol state machine is performed by procedures such as an event conversion, Queue operation, a state conversion, and a step semantics conversion. In the event conversion, an event set is expressed by a scalar 'Event' that lists types of event that a state machine may have.

Since the UML state machine stores the occurred event in the Queue, the Queue operation is performed by expressing the Queue as an array. The array of the SMT is processed as a single function. Operations handling the queue have an 'enQueue' inserting an event into the Queue and a 'deQueue' drawing out the event from the Queue. In order to use the Queue, values of the head and the tail need to be kept and changed and are processes according to a case when an event is generated due to generation of transition or when an event is dispatched in an event Queue.

Moreover, in the state conversion, a state may include another state machine. When it is assumed that the state machines are spread in parallel, the state machine is performed by expressing which states of the respective state machines are activated with their state sets. Therefore, a state machine is declared with a set of states by the above-mentioned Definition 2.

Meanwhile, in the step semantics conversion, a step starts from 'STEP 0'. In 'STEP 0', initial values of the respective state machines and events are set, the event Queue is expressed as the initial value of the state machine, and the remaining steps are performed by expressing 'STEP 1' repeatedly.

After that, the respective transitions are defined to be true when a trigger and the pre-condition are satisfied according to the formal semantics of the defined protocol state machine, a shape is correct, and the transition collision does not exist. Values of the state variables are determined according to whether the transition is generated. The post-condition is defined to be satisfied when a corresponding transition is generated.

As such, the SMT conversion including the event conversion, Queue operation, the state conversion, and the step semantics conversion is performed to the protocol state machine diagram of the software design model to output the first SMT logic formula corresponding to the protocol state machine diagram.

Further, the sequence diagram converter 104 of the SMT conversion block 100 performs the SMT conversion including an early state selection, an occurrable action description, an executing action selection, and a next state description caused by a transition relationship when the reverse sequence diagram of the software design model is inputted in step S408. Then, the sequence diagram converter 104 outputs the third SMT logic formula corresponding to the reverse sequence diagram to the SMT processing block 200.

For example, if the sequence diagram is converted into a labeled transition system (hereinafter, referred to as 'LTS'), a state set of LTS is {s0, s1}, an action set is {a1. a2. a3}, and an action enabled at an original state s0 is a1, a reverse action at this state means that transition is added to arrived at a virtual error state when actions a2 and a3 occur.

Here, the SMT conversion of the reverse sequence diagram of the software design model is performed by the early state selection, the occurrable action description, the executing action selection, and the next state description caused by a transition relationship such that the early state is selected, actions occurrable at the respective states are described, and executing actions are selected. Here, the executing action is declared as a _Action variable and is described such that an action occurrable at a state variable _State_1, which is declared in the early state, is mapped.

The next state is described according to the transition relationship and is determined by a currently generated action and the transition relationship. That the next state is assigned means that a condition to be the next state needs to be satisfied and is expressed with the SMT by the above-mentioned Definition 13. The second assert statement means that a case where the next state becomes s8 is that the action ok is generated either at a state s5 or at a state s7.

Next, in step S410, the SMT processing block 200 performs the SMT processing of proving satisfiability using the first SMT logic formula corresponding to the protocol state machine diagram and the third SMT logic formula corresponding to the sequence diagram, which are outputted from the SMT conversion block 100.

The SMT processing block 200 checks whether the result of the SMT processing performed in step S410 is satisfied in step S412.

When the result of the SMT processing in step S410 is satisfied in step S412, the SMT processing block 200 outputs a contradictory behavior scenario of the software design model in step S414.

When the result of the SMT processing performed in step S410 is dissatisfied in step S412, the SMT processing block 200 outputs an internal contradiction result of the protocol state machine diagram in step S416.

Thus, the correspondence between the protocol state machine diagram and the sequence diagram of a software design model can be verified by performing the SMT conversion and the SMT processing using the protocol state machine diagram and the reverse sequence diagram of the software design model to output the contradictory behavior scenario when the result of the SMT processing is satisfied and to output the internal contradictory behavior scenario when the result is dissatisfied.

The embodiments of the present invention are written as program commands to be executed by various devices such as a computer and recorded in a computer-readable storage medium by a computer. The computer-readable storage medium may include program commands, a data file, a data structure, and combination thereof. This storage medium is designed and configured for the present invention, or well known to the skilled in the computer software engineers.

The computer-readable storage medium includes, e.g., a magnetic medium such as a hard disk, a floppy disk, and a magnetic tape, an optical medium such as a CD-ROM, a DVD, and the like, a magneto-optical medium such as a floptical disk, ROM, RAM, and a hardware device for storing and executing program commands such as a flash memory.

The medium is a transmission medium for delivering carriers to carry signals to which program commands, a data structure and the like are assigned, such as light, a metal wire, and a waveguide. The program commands includes machine language codes transformed by a compiler and high level language codes executed by a computer using an interpreter.

While the invention has been shown and described with respect to the embodiments, it will be understood by those skilled in the art that various changes and modifications may be made without departing from the scope of the invention as defined in the following claims.

What is claimed is:

1. An apparatus for analyzing a fault behavior of a software design model, comprising:
 a satisfiability modulo theories (SMT) conversion block for performing an SMT conversion with respect to a protocol state machine diagram and a sequence diagram of the software design model; and
 an SMT processing block for performing an SMT processing using respective logic formulas corresponding to the protocol state machine diagram and the sequence diagram and outputted from the SMT conversion block, and determining whether a result of the SMT processing is satisfied to output an occurrable behavior scenario when the result of the SMT processing is satisfied.

2. The apparatus of claim 1, wherein the SMT conversion block performs the SMT conversion with respect to the protocol state machine diagram and a reverse sequence diagram when the result of the SMT processing is dissatisfied.

3. The apparatus of claim 2, wherein the SMT processing block determines whether the result of the SMT processing is satisfied by performing the SMT processing using the respective logic formulas corresponding to the protocol state machine diagram and the reverse sequence diagram outputted from the SMT conversion block; outputs a contradictory behavior scenario when the result of the SMT processing is satisfied; and outputs an internal contradictory result of the protocol state machine diagram when the result of the SMT processing is dissatisfied.

4. The apparatus of claim 2, wherein the SMT conversion block comprises:
 a protocol state machine diagram converter for performing the SMT conversion by an event conversion, a Queue operation, a state conversion, and a step semantics conversion with respect to the protocol state machine diagram; and
 a sequence diagram converter for performing the SMT conversion by an early state selection, an occurrable action description, an executing action selection, and a next state description caused by a transition relationship with respect to the sequence diagram or the reverse sequence diagram.

5. The apparatus of claim 4, wherein the protocol state machine diagram converter performs the event conversion by expressing an event set of the protocol state machine diagram in a scalar form listing types of events that a state machine has.

6. The apparatus of claim 5, wherein the protocol state machine diagram converter, after performing the event conversion, performs the Queue operation by expressing a Queue as an array such that an occurred event is stored in the Queue.

7. The apparatus of claim 6, wherein the protocol state machine diagram converter, after performing the Queue operation, performs the state conversion by expressing that which state of respective state machines, which are spread in parallel, is activated as a state set.

8. The apparatus of claim 7, wherein the protocol state machine diagram converter, after performing the state conversion, performs the step semantics conversion by setting initial values of the respective state machines and the events in 'STEP 0', expressing an event Queue as an initial value of a state machine, and expressing the remaining steps by repeating 'STEP 1'.

9. The apparatus of claim 4, wherein the sequence diagram converter selects an early state of the sequence diagram, describes actions occurrable at respective states, selects an executing action, and describes a next state according to the transition relationship to determine the next state caused by a currently occurred action and the transition relationship.

10. The apparatus of claim 4, wherein the sequence diagram converter selects an early state of the reverse sequence diagram, describes actions occurrable at respective states, selects an executing action, and describes a next state according to the transition relationship to determine the next state caused by a currently occurred action and the transition relationship.

11. A method of analyzing a fault behavior of a software design model, comprising:
 performing a satisfiability modulo theories (SMT) conversion of a protocol state machine diagram and a sequence diagram of the software design model;
 performing, using a computer, an SMT processing using respective logic formulas, corresponding to the protocol state machine diagram and the sequence diagram, outputted from an SMT conversion block to determine whether a result of the SMT processing is satisfied; and
 outputting an occurrable behavior scenario when the result of the SMT processing is satisfied.

12. The method of claim 11, further comprising performing the SMT conversion with respect to the protocol state machine diagram and a reverse sequence diagram when the result of the SMT processing is dissatisfied.

13. The method of claim 12, further comprising:
determining whether the result of the SMT processing is satisfied by performing the SMT processing using the respective logic formulas corresponding to the protocol state machine diagram and the reverse sequence diagram outputted from the SMT conversion block;
outputting a contradictory behavior scenario when the result of the SMT processing is satisfied; and
outputting an internal contradictory result of the protocol state machine diagram when the result of the SMT processing is dissatisfied.

14. The method of claim 12, wherein the SMT conversion is performed by performing an event conversion, a Queue operation, a state conversion, and a step semantics conversion of the protocol state machine diagram; and selecting an early state, describing an occurrable action, selecting an executing action, and describing a next state caused by a transition relationship of the sequence diagram or the reverse sequence diagram.

15. The method of claim 14, wherein the event conversion is performed by expressing an event set of the protocol state machine diagram in a scalar form listing types of events that a state machine has.

16. The method of claim 15, wherein the Queue operation is performed, after performing the event conversion, by expressing a Queue as an array such that an occurred event is stored in the Queue.

17. The method of claim 16, wherein the state conversion is performed, after performing the Queue operation, by expressing that which state of respective state machines, which are spread in parallel, is activated as a state set.

18. The method of claim 17, wherein the step semantics conversion is performed, after performing the state conversion, by setting initial values of the respective state machines and the events in 'STEP 0', expressing an event Queue as an initial value of a state machine, and expressing the remaining steps by repeating 'STEP 1'.

19. The method of claim 14, wherein the SMT conversion is performed by selecting the early state of the sequence diagram, describing actions occurrable at respective states, selecting the executing action and describing a next state according to the transition relationship to determine the next state caused by a currently occurred action and the transition relationship.

20. The method of claim 14, wherein the SMT conversion is performed by selecting the early state of the reverse sequence diagram, describing actions occurrable at respective states, selecting the executing action, and describing a next state according to the transition relationship to determine the next state caused by a currently occurred action and the transition relationship.

* * * * *